United States Patent Office 3,186,999
Patented June 1, 1965

3,186,999
ISOTHIAZOLE DERIVATIVES
Ronald Slack, Chelsea, London, Sydney Leonard Squires, East Ham, London, and Kenneth Robert Harry Wooldridge, Brentwood, Essex, England, assignors to May & Baker Limited, Dagenham, Essex, England, a British company
No Drawing. Filed Mar. 15, 1962, Ser. No. 180,031
Claims priority, application Great Britain, Mar. 16, 1961, 9,731/61
6 Claims. (Cl. 260—302)

This invention relates to new therapeutically useful isothiazole derivatives, to processes for their preparation and pharmaceutical compositions containing them.

According to the present invention, there are provided new isothiazole derivatives of the general formula:

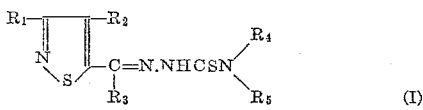

(I)

wherein $R_1$ represents a lower alkyl group, $R_2$ represents a hydrogen or halogen atom or an amino or nitro group, $R_3$ represents a hydrogen atom or a lower alkyl group, and $R_4$ and $R_5$ are the same or different and represent hydrogen atoms, lower alkyl, lower hydroxyalkyl or lower alkoxyalkyl groups, or $R_4$ and $R_5$ together with the nitrogen atom to which they are attached collectively represent a six-membered mononuclear saturated heterocyclic group such as morpholino or piperazino.

The word "lower" as applied in this specification and the appended claims to alkyl, hydroxyalkyl or alkoxyalkyl groups means that the alkyl, hydroxyalkyl and alkoxyalkyl groups contain at most 6 carbon atoms.

The aforesaid isothiazole derivatives possess useful antiviral properties, having, in particular, high activity against the pox group of viruses, for example, variolae major and vaccinia. Compounds found to be particularly useful against such infections are those in which $R_2$ represents a hydrogen or halogen atom, and $R_4$ and $R_5$ each represent a hydrogen atom or a lower alkoxyalkyl group; in particular 3-methylisothiazole-5-carboxaldehyde thiosemicarbazone, 4-bromo-3-methylisothiazole-5-carboxaldehyde thiosemicarbazone, 5-acetyl-4-bromo-3-methylisothiazole thiosemicarbazone, 3-methylisothiazole-5-carboxaldehyde 4'-(β-ethoxyethyl)thiosemicarbazone and 5-acetyl-3-methylisothiazole thiosemicarbazone, especially the two first-mentioned compounds.

According to a feature of the present invention, the isothiazole derivatives of general Formula I are prepared by reacting an aldehyde or ketone of the formula:

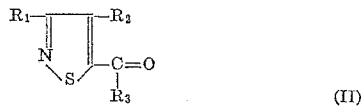

(II)

(wherein $R_1$, $R_2$ and $R_3$ are as hereinbefore defined) or a suitable derivative thereof, such as an acetal, diacetate, oxime or semicarbazone, with a thiosemicarbazide of the formula:

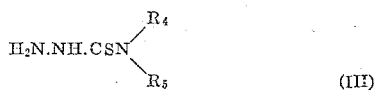

(III)

(wherein $R_4$ and $R_5$ are as hereinbefore defined) or an acid addition salt, e.g. hydrochloride, thereof by known methods. For example, the reaction may be effected in water in the presence of a mineral acid such as hydrochloric acid, either at room temperature or with gentle warming.

By the term "known methods" as used in this specification and the appended claims is meant methods heretofore used or described in the literature.

According to a further feature of the invention, the compounds of general Formula I in which $R_3$ represents a hydrogen atom are prepared by reacting an arylsulphonylcarboxyhydrazide of the formula:

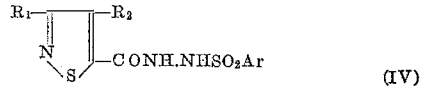

(IV)

(wherein Ar represents an aryl group, such as phenyl or methylphenyl, and $R_1$ and $R_2$ are as hereinbefore defined) with a thiosemicarbazide of Formula III or an acid addition salt thereof. The reaction is preferably carried out in a polar solvent, such as ethylene glycol or glycerol, in the presence of a basic condensing agent, such as an alkali metal carbonate, at an elevated temperature, preferably in the range 130–170° C. The reaction proceeds more smoothly and a higher yield of the desired product is obtained if it is effected in the presence of an inert material of large surface area such as powdered glass or glass wool.

According to a still further feature of the invention, the compounds of Formula I in which $R_4$ and $R_5$ are hydrogen atoms are prepared by the reaction of a hydrazone of the formula:

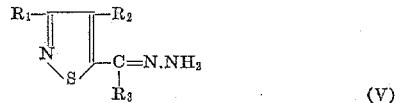

(V)

(wherein $R_1$, $R_2$ and $R_3$ are as hereinbefore defined) with an alkali metal thiocyanate (preferably potassium thiocyanate) in the presence of a mineral acid such as hydrochloric or sulphuric acid.

The thiosemicarbazones of Formula I in which $R_2$ represents an amino group can be prepared from the corresponding thiosemicarbazones of Formula I in which $R_2$ represents a nitro group by known methods for the reduction of a nitro substituent in an aromatic nucleus to amino without affecting a semicarbazone substituent also present, for example, by reduction with aqueous ferrous sulphate.

The intermediates of Formulae II, IV and V are themselves new compounds.

Carbonyl compounds of Formula II may be prepared by the following general methods.

(1) In the case of those compounds where $R_3$ represents a hydrogen atom:
(i) By reduction of the nitriles of the formula

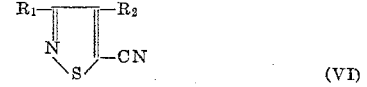

(VI)

(wherein $R_1$ and $R_2$ are as hereinbefore defined) with lithium trimethoxyaluminum hydride. The preparation of one of the nitriles of Formula VI (where $R_1$ is methyl and $R_2$ is a hydrogen atom) has already been described in the literature (Adams and Slack, J.C.S., 3061–3072 (1959)) from 5-amino-3-methylisothiazole via the corresponding 5-bromo compound. The other nitriles of Formula VI where $R_1$ is an alkyl group and $R_2$ is a hydrogen atom may be prepared in a similar manner from 5-amino-3-alkylisothiazoles, i.e. by converting the 5-amino-3-alkylisothiazoles to corresponding diazonium salts and reacting the salts with cuprous bromide to give the 5-bromo-3-alkylisothiazoles, which on reaction with cuprous cyanide give the required 5-cyano-3-alkylisothiazoles.

The nitriles of Formula VI in which $R_1$ is an alkyl group and $R_2$ is a halogen atom may be prepared from the corresponding compounds of Formula VI in which $R_2$ is a hydrogen atom by halogenation, e.g. bromination, by known methods for the nuclear halogenation of aromatic compounds. Similarly, the nitriles of Formula VI in which $R_1$ is an alkyl group and $R_2$ is a nitro group may be prepared from the corresponding compounds of Formula VI in which $R_2$ is a hydrogen atom by nitration by known methods for the nitration of aromatic compounds. The nitriles of Formula VI in which $R_1$ is an alkyl group and $R_2$ is an amino group may be prepared from the nitriles of Formula VI in which $R_2$ is a nitro group. By known methods for the reduction of a nitro substituent in an aromatic nucleus to an amino group, for example, by reaction with ferrous sulphate.

(ii) By reaction of a compound of the formula

(VII)

(wherein Hal represents a halogen atom such as chlorine, bromine or iodine, and $R_1$ and $R_2$ are as hereinbefore defined) with a lithium alkyl such as butyl lithium and reacting the lithium derivative so produced with dimethylformamide.

The preparation of the compounds of Formula VII where $R_1$ is a methyl group, $R_2$ is a hydrogen atom or a nitro group and Hal is a chlorine, bromine or iodine atom, has been described in the laterature (Adams and Slack, loc. cit.). The remaining compounds of Formula VII where $R_1$ is an alkyl group and $R_2$ is a hydrogen atom or a nitro group may be prepared by application of known methods from the corresponding 5-amino-3-alkylisothiazoles as follows: (a) where $R_2$ is a hydrogen atom, by diazotisation of a 5-amino-3-alkylisothiazole followed by reaction of the resultant diazonium salt with a metallic halide such as cuprous chloride or bromide or potassium iodide, (b) where $R_2$ is a nitro group, by nitration of the corresponding compounds of Formula VII where $R_2$ is a hydrogen atom by known methods for the nitration of aromatic compounds. The corresponding compounds of Formula VII where $R_2$ is an amino group can be obtained by reduction of the corresponding compounds of Formula VII where $R_2$ is a nitro group according to known methods, for example, by catalytic hydrogenation.

(2) In the case of those compounds in which $R_3$ represents an alkyl group:

(i) By reaction of nitriles of Formula VI with a Grignard reagent of the formula $R_3MgHal$ (wherein Hal and $R_3$ are as hereinbefore defined) and decomposition of the resulting compound by treatment with water, or with a dilute mineral acid such as dilute sulphuric acid.

(ii) By decarboxylation of an acid of the formula

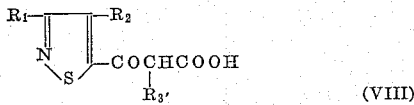

(VIII)

(wherein $R_{3'}$ represents a hydrogen atom or an alkyl group containing at most 5 carbon atoms, and $R_1$ and $R_2$ are as hereinbefore defined) by heating, either alone or in the presence of an inert solvent or diluent.

The acids of Formula VIII may be prepared in accordance with the following reaction scheme:

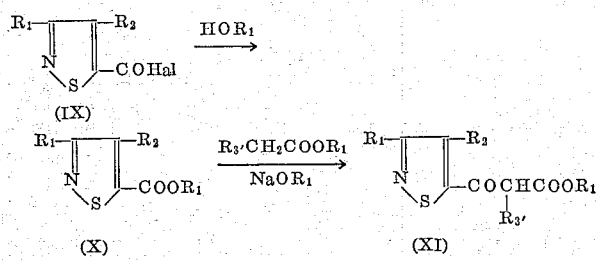

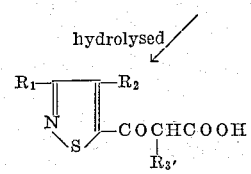

An isothiazole-5-carboxylic acid halide of Formula IX is reacted with a lower alkanol to produce the corresponding lower alkyl isothiazole-5-carboxylate of Formula X. Reaction of this ester with an ester containing a reactive methylene group in the α-position in the presence of the corresponding sodium alkoxide gives a lower alkyl isothiazoloyl-α-alkyl acetate of Formula XI which on hydrolysis produces an acid conforming to Formula VIII. For example, 3-methylisothiazole-5-carboxylic acid chloride may be reacted with ethanol to produce ethyl 3-methylisothiazole-5-carboxylate. Reaction of this ester with ethyl acetate in the presence of sodium ethoxide gives ethyl 3 - methylisothiazoloyl - 5 - acetate, which on hydrolysis gives 3-methylisothiazoloyl-5-acetic acid.

The intermediates of Formula V may be conveniently prepared from the carbonyl compounds of Formula II by known methods, for example, by reaction with hydrazine.

The intermediates of Formula IV may be prepared by the reaction of a carboxyhydrazide of the formula:

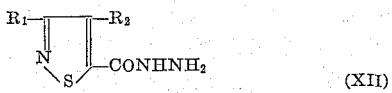

(XII)

(wherein $R_1$ and $R_2$ are as hereinbefore defined) with an arylsulphonyl halide of the formula $HalSO_2Ar$ (wherein Ar and Hal are as hereinbefore defined). The reaction is conveniently carried out at a low temperature such as —5 to 0° C. and in the presence of a weak base such as pyridine.

The compound of Formula XII where $R_1$ is a methyl group and $R_2$ is a hydrogen atom may be prepared as described in the literature (Adams and Slack, loc. cit). The other hydrazides of Formula XII where $R_1$ is an alkyl group may be prepared by similar methods, e.g. (a) converting a 3-alkylisothiazole-5-carboxylic acid via the corresponding acid chloride to the methyl ester, and reacting the ester with hydrazine to produce the required 3-alkylisothiazole-5-carboxyhydrazide, (b) halogenating a 3-alkylisothiazole-5-carboxylic acid to form the corresponding 3-alkyl-4-halogenoisothiazole-5-carboxylic acid and converting the acid via the corresponding acid chloride and methyl ester to a carboxyhydrazide of Formula XII in which $R_1$ is an alkyl group and $R_2$ is a halogen atom, and (c) nitrating a 3-alkylisothiazole-5-carboxylic acid and converting the product obtained via the acid chloride and methyl ester to a carboxyhydrazide of Formula XII in which $R_1$ is an alkyl group and $R_2$ is a nitro group. The carboxyhydrazides of Formula XII in which $R_2$ is an amino group may be prepared by the reduction of the corresponding carboxyhydrazides of Formula XII in which $R_2$ is a nitro group according to known methods, for example, by treatment with aqueous ferrous sulphate or by catalytic hydrogenation using a Raney nickel catalyst.

The intermediates of Formula IV may also be prepared by the reaction of an acid halide of the formula:

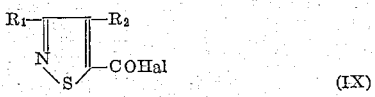

(IX)

(wherein $R_1$, $R_2$ and Hal are as hereinbefore defined) with an arylsulphonylhydrazide of the formula $H_2N.NH.SO_2Ar$ (wherein Ar is as hereinbefore defined). The acid halides of Formula IX may be prepared from the corresponding acids as indicated above.

The following examples illustrate the invention.

*Example I*

A vigorously stirred suspension of powdered soda glass (150 g.) in glycerol (500 ml.) was heated to 145° C. and an intimately ground mixture of 3-methylisothiazole-5-benzenesulphonylcarboxyhydrazide (100 g.; 0.34 mole), anhydrous sodium carbonate (20 g.; 0.19 mole) and thiosemicarbazide (35 g.; 0.38 mole) added in portions during 15 minutes. The reaction mixture was stirred for a further 10 minutes at 140–145° C., then cooled to 75° C., filtered and the residue washed with ethanol (500 ml.). The filtrate was diluted to 3000 ml. with water and allowed to stand at 0° C. for 12 hours. The solid which separated was filtered off and dried at 60° C. to give 3-methylisothiazole-5-carboxaldehyde thiosemicarbazone (33.4 g.; 50%), M.P. 191–196° C. Crystallisation from ethanol gave the thiosemicarbazone as pale yellow prisms, M.P. 196–200° C.

The benzenesulphonylcarboxyhydrazide used as starting material was prepared from 3-methylisothiazole-5-carboxyhydrazide as follows:

3-methylisothiazole-5-carboxyhydrazide (47 g.; 0.30 mole) was suspended in dry pyridine (250 ml.) at −5° C. and benzenesulphonyl chloride (69 g.; 0.39 mole) added slowly with cooling to keep the reaction mixture temperature between 0° C. and −5° C. After the addition was complete the reaction mixture was allowed to attain room temperature and then poured onto a mixture of concentrated hydrochloric acid (300 ml.) and ice (ca. 1 kg.) giving a viscous oil which solidified on standing. The resulting solid was collected and boiled with ethanol (250 ml.) for 15 minutes, cooled and the solid filtered off and dried at 80° C. to give 3-methylisothiazole - 5 - benzenesulphonylcarboxyhydrazide (58 g.; 73%), M.P. 185–189° C.

*Example II*

A vigorously stirred suspension of powdered soda glass (200 g.; passed through a 30 mesh sieve) in glycerol (1000 ml.) was heated to 148–150° C. To this suspension an intimate mixture of 4-bromo-3-methylisothiazole-5 - benzenesulphonylcarboxyhydrazide (200 g.; 0.532 mole), anhydrous sodium carbonate (56 g.; 0.532 mole), and thiosemicarbazide (48.5 g.; 0.532 mole) was added in portions over 15 minutes. The reaction mixture was stirred for a further 5 minutes at 148–150° C. and then cooled to 45–50° C. N sodium hydroxide solution (2000 ml.) was added and the resulting mixture stirred for 5 minutes, filtered and the residue washed with N sodium hydroxide solution (2 x 150 ml.) and water (2 x 250 ml.). The dark red filtrate was cooled and acidified with 5 N hydrochloric acid. The solid which separated was collected and dried to give 4-bromo-3-methylisothiazole - 5 - carboxaldehyde thiosemicarbazone (89 g.; 60%), M.P. 205–210° C. (decomp.). Crystallisation from ethanol gave the thiosemicarbazone as yellow prisms, M.P. 220–224° C. (decomp.).

Following the procedure described above but using 4-methylthiosemicarbazide instead of thiosemicarbazide, 4-bromo - 3 - methylisothiazole - 5 - benzenesulphonylcarboxyhydrazide (15 g.) gave 4-bromo-3-methylisothiazole-5-carboxaldehyde 4'-methyl-thiosemicarbazone (2.8 g.; 24%), M.P. 233–240° C. (decomp.).

The benzenesulphonylcarboxyhydrazide used as starting material was prepared from 3-methylisothiazole-5-carboxylic acid as follows:

(i) 3-methylisothiazole-5-carboxylic acid (454 g.; 3.22 mole) was dissolved in a solution of sodium bicarbonate (538 g.; 6.40 mole) in water (4500 ml.), and bromine (564 g.; 3.52 mole) added during 90 minutes to the vigorously stirred solution. The reaction mixture was stirred for a further 4 hours and then allowed to stand overnight at room temperature. The reaction mixture was brought to pH 10 by the addition of 50% sodium hydroxide solution, treated with charcoal (20 g.) and filtered. The filtrate was acidified to pH 2 with concentrated hydrochloric acid (ca. 700 ml.) to give 4-bromo-3-methylisothiazole-5-carboxylic acid (534 g.; 76%), M.P. 202–203° C.

4-bromo-3-methylisothiazole-5-carboxylic acid (38 g.; 0.171 mole) was added to thionyl chloride (100 ml.), and the reaction mixture heated under reflux until a clear solution was obtained (60 minutes). The excess thionyl chloride was distilled off and the residue fractionally distilled under reduced pressure to give 4-bromo-3-methylisothiazole-5-carboxylic acid chloride (30 g.; 73%), B.P. 123–126° C./15 mm.

4-bromo-3-methylisothiazole-5-carboxylic acid chloride (62 g.; 0.258 mole) was added dropwise with stirring to refluxing dry methanol (200 ml.). The excess methanol was distilled off under reduced pressure to leave a residue of methyl 4-bromo-3-methylisothiazole-5-carboxylate (56 g.; 91%), M.P. 76–78° C.

Methyl 4-bromo-3-methylisothiazole-5-carboxylate (56 g.; 0.237 mole) was dissolved in dry methanol (600 ml.), and hydazine hydrate (12.5 ml.; 0.25 mole) added during 10 minutes with stirring. The reaction mixture was refluxed for 10 minutes and then cooled in ice. The solid which separated was collected and dried to give 4-bromo-3-methylisothiazole-5-carboxyhydrazide (41 g.; 75%), M.P. 166–168° C.

4 - bromo - 3 - methylisothiazole - 5 - carboxyhydrazide (35 g.; 0.149 mole) was suspended in dry pyridine (150 ml.) at −5° C. and benzenesulphonyl chloride (35.3 g.; 0.200 mole) added at such a rate that the temperature remained below 0° C. The reaction mixture was allowed to attain room temperature and then heated to 40° C. for a few minutes to dissolve traces of solid. After standing for 1 hour, the solution so obtained was poured onto a mixture of concentrated hydrochloric acid (200 ml.) and ice (ca. 750 g.) to give a viscous oil which solidified on standing. The resulting solid was collected and boiled with ethanol (200 ml.) for 15 minutes, cooled and filtered to give, after drying at 80° C., 4-bromo-3-methylisothiazole - 5 - benzenesulphonylcarboxyhydrazide (44 g.; 79%), M.P. 151–156° C.

(ii) 4 - bromo - 3 - methylisothiazole - 5 - carboxylic acid chloride (578 g.; 2.4 mole) (prepared as described in (i) above) in chloroform (750 ml.) was added, during 1 hour, to a boiling, stirred solution of benzenesulphonylhydrazide (414 g.; 2.4 mole) in chloroform (4000 ml.). The reaction mixture was stirred under reflux for 4 hours, cooled, and 4-bromo-3-methylisothiazole-5-benzenesulphonylcarboxyhydrazide (720 g.; 80%), M.P. 150–155° C., collected. The mother liquors were concentrated and cooled to give a second crop of the benzenesulphonylcarboxyhydrazide (65 g.; 7%).

*Example III*

3-methylisothiazole-5-carboxaldehyde (0.66 g.; 0.0052 mole) was added to a solution of thiosemicarbazide (3.00 g.; 0.033 mole) in water (10 ml.) and concentrated hydrochloric acid (3 ml.). After 30 minutes, 3-methylisothiazole-5-carboxaldehyde thiosemicarbazone (0.42 g.; 42%), M.P. 196–198° C. (decomp.), was filtered off and dried.

The 3-methylisothiazole-5-carboxaldehyde used as starting material may be prepared by either of the following methods:

(i) To a solution of butyl lithium (3.55 g.; 0.055 mole) in anhydrous tetrahydrofuran (100 ml.) at −70° C. in an atmosphere of nitrogen was added, during 25 minutes, a solution of 5-bromo-3-methylisothiazole (8.9 g.; 0.05 mole) in tetrahydrofuran (50 ml.). After 5 minutes at −70° C., a solution of dimethyl formamide (4.01 g.; 0.055 mole) in tetrahydrofuran (5 ml.) was added all at once. The stirred reaction mixture was allowed to attain room temperature, and 2 N hydrochloric acid (40 ml.) was added. The mixture was separated and the organic layer dried and evaporated. The residual liquid was fractionally distilled to give 3-methylisothiazole-5-carboxaldehyde (2.5 g.; 39%), B.P. 105–107° C./20 mm.

(ii) Anhydrous methanol (19.2 g.; 0.60 mole) was added, during 20 minutes, to a suspension of lithium aluminium hydride (9.5 g.; 0.24 mole) in ether (150 ml.) at 0° C. 5-cyano-3-methylisothiazole (20 g.; 0.16 mole) in ether (100 ml.) was then added during 1 hour, the reaction temperature being kept at 0° C. After 2 hours, water (40 ml.) was added to the reaction mixture, followed by 2 N sulphuric acid (200 ml.). The ethereal layer was separated, dried and evaporated to give an oil. Fractional distillation of the oil gave 3-methylisothiazole-5-carboxaldehyde (6 g.; 30%), B.P. 105–112° C./24 mm.

*Example IV*

Following a similar procedure to that described in Example III but using 4,4-dimethylthiosemicarbazide instead of thiosemicarbazide, there was obtained 3-methylisothiazole - 5 - carboxaldehyde 4',4' - dimethylthiosemicarbazone, M.P. 168–170° C. (decomp.).

*Example V*

Following a similar procedure to that described in Example III but using 4-(β-ethoxyethyl)-thiosemicarbazide instead of thiosemicarbazide, there was obtained 3-methylisothiazole - 5 - carboxaldehyde 4'-(β-ethoxyethyl)-thiosemicarbazone, M.P. 276–278° C. (decomp.).

*Example VI*

5-acetyl-3-methylisothiazole (3.4 g.; 0.024 mole) was dissolved in ethanol (50 ml.) and added to a solution of thiosemicarbazide (2.0 g.; 0.022 mole) in 2 N hydrochloric acid (25 ml.). After 6 hours, yellow crystals of 5-acetyl-3-methylisothiazole thiosemicarbazone (2.65 g.; 56%), M.P. 215–219° C., were collected and dried.

The 5-acetyl-3-methylisothiazole used as starting material may be prepared by either of the following methods:

(i) To a solution of methyl magnesium iodide in ether (prepared from 5.7 g. magnesium, 3.19 g. methyl iodide and 250 ml. ether) was added dropwise over 30 minutes a solution of 5-cyano-3-methylisothiazole (12.4 g.; 0.10 mole) in ether (60 ml.). The reaction mixture was refluxed with stirring for 4 hours and then poured on to a mixture of 2 N sulphuric acid (250 ml.) and ice (ca. 250 g.). After standing for 30 minutes, the mixture was steam distilled and the distillate ether extracted. Evaporation of the dried extract and fractional distillation of the residual oil gave 5-acetyl-3-methylisothiazole (3.4 g.; 24%), B.P. 108–110° C./13 mm.

(ii) 3-methylisothiazole-5-carboxylic acid (46 g.; 0.32 mole) was added to thionyl chloride (150 ml.) and the reaction mixture heated under reflux until a clear solution was obtained (60 minutes). The excess thionyl chloride was distilled off and the residue fractionally distilled under reduced pressure to give 3-methylisothiazole-5-carboxylic acid chloride (40 g.; 77%), B.P. 92–92.5° C./18 mm.

3-methylisothiazole-5-carboxylic acid chloride (40 g.; 0.25 mole) was added dropwise over 20 minutes to dry ethanol (200 ml.). The reaction mixture was refluxed for 10 minutes and then the excess ethanol was distilled off. The residual liquid was fractionally distilled to give ethyl 3-methylisothiazole-5-carboxylate (39.5 g.; 93%), B.P. 100° C./9 mm.

A mixture of ethyl 3-methylisothiazole-5-carboxylate (48 g.; 0.28 mole) and ethyl acetate (63 g.; 0.72 mole) was added to a hot suspension of sodium ethoxide (31.7 g.; 0.466 mole) in dry toluene (150 ml.). The reaction mixture was refluxed with stirring for 6 hours and then evaporated to dryness under reduced pressure. The residue was treated with 2 N acetic acid (300 ml.) and ether extracted. The dried extract was evaporated and the residual oil fractionally distilled to give ethyl 3-methylisothiazol-oyl-5-acetate (43.5 g.; 73%), B.P. 170–172° C./16 mm.

Ethyl 3-methylisothiazoloyl-5-acetate (10 g.; 0.047 mole), concentrated hydrochloric acid (60 ml.) and dioxan (60 ml.) were heated under reflux for 2 hours. The reaction mixture was then poured onto ice and ether extracted. The dried ethereal extract was evaporated and the residual oil fractionally distilled under reduced pressure to give 5-acetyl-3-methylisothiazole (3.65 g.; 55%), B.P. 108–110° C./12 mm.

*Example VII*

Following the procedure of Example VI but using 5-acetyl-4-bromo-3-methylisothiazole instead of 5-acetyl-3-methylisothiazole, gave 5-acetyl-4-bromo-3-methylisothiazole thiosemicarbazone, M.P. 209–212° C.

The 5-acetyl-4-bromo-3-methylisothiazole used as starting material was prepared from 4-bromo-3-methylisothiazole-5-carboxylic acid chloride (prepared as described in Example II) as follows:

Following the procedure described in Example II, except that dry ethanol was used instead of methanol, 4-bromo-3-methylisothiazole-5-carboxylic acid chloride (216 g.; 0.92 mole) gave ethyl 4-bromo-3-methylisothiazole-5-carboxylate (201 g.; 90%), B.P. 134–136° C./12 mm.

A mixture of ethyl 4-bromo-3-methylisothiazole-5-carboxylate (28.5 g.; 0.114 mole) and ethyl acetate (24.0 g.; 0.273 mole) was added to a hot suspension of sodium ethoxide (12.9 g.; 0.19 mole) in dry toluene (70 ml.). The reaction mixture was refluxed with stirring for 6 hours and the toluene was distilled off under reduced pressure. The residue was treated with 2 N acetic acid (200 ml.) and ether extracted. The ethereal extract was dried and evaporated to give ethyl 4-bromo-3-methylisothiazoloyl-5-acetate (26.5 g.; 80%), M.P. 63–66° C.

Ethyl 4-bromo-3-methylisothiazoloyl-5-acetate (10 g.; 0.034 mole), concentrated hydrochloric acid (60 ml.) and dioxan (60 ml.) were heated under reflux for 2 hours. The reaction mixture was poured on to ice and ether extracted. The dried ethereal extract was evaporated and the residual oil fractionally distilled under reduced pressure to give 5-acetyl-4-bromo-3-methylisothiazole (4.44 g.; 59%), B.P. 134–137° C./16 mm.

The present invention includes within its scope pharmaceutical compositions which comprise one or more of the compounds of general Formula I together with a significant amount of a non-toxic carrier which may be either a solid material or a liquid. In clinical practice the compounds of the present invention will normally be administered orally, in consequence of which the preferred compositions are those of the kind suitable for oral administration.

Solid compositions for oral administration include compressed tablets, pills, dispersible powders, and granules. In such solid compositions one or more of the active compounds of general Formula I is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention, for oral administration also include capsules of absorbable material such as gelatin containing one or more of the active substances of general Formula I with or without the addition of diluents or excipients.

Preparations according to the invention for parenteral administration include sterile aqueous or non-aqueous solutions, suspensions or emulsions. Examples of non-aqueous solvents or suspending media are propylene glycol, polyethylene glycol, vegetable oils such as olive oil, and injectable organic esters such as ethyl oleate. The compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

For the treatment of animals, compounds of general Formula I may be incorporated in the animal foodstuff, i.e. an organic or mineral substance which is intended to be fed to the animals, or drinking water. Incorporation of the active ingredient in the foodstuff, which in the case of fowl may be a commercial starting, laying or growing mash, may be effected by dissolving the compound in an organic solvent, dispersing the solution so obtained in the food and removing the solvent by any means known to the art. The active substance may also be incorporated in the foodstuff in the form of a powder containing the active ingredient or ingredients and a solid, non-toxic inert carrier, e.g., talc, kaolin or chalk. To the powders there may be added before admixture to the foodstuff one or non-toxic wetting and/or dispersing agents, for example, the condensation product of β-naphthalene sulphonic acid and formaldehyde or sodium lauryl sulphate. When a wetting or dispersing agent is added to the powder, the composition so obtained may be mixed with water to provide stable dispersions suitable for addition to drinking water.

The percentage of active ingredient in the compositions of the invention may be varied, it being necessary that it should constitute a proportion such that a suitable dosage shall be obtained. Obviously several unit dosage forms may be administered at about the same time. In general, pharmaceutical preparations of the present invention should normally contain at least 0.025% by weight of active substance in the case of injectable solutions and at least 0.1% by weight of such substance in the case of oral preparations.

The following example illustrates pharmaceutical compositions according to the invention.

*Example VIII*

Tablets were prepared of the formula:

|  | Mg. |
|---|---|
| 3-methylisothiazole-5-carboxaldehyde thiosemicarbazone | 50 |
| Lactose | 247.5 |
| Starch | 100 |
| Dextrin | 100 |
| Magnesium stearate | 2.5 | by intimately mixing the thiosemicarbazone, lactose, starch and dextrin and passing the mixture through a 60 mesh British Standard sieve. After addition of the magnesium stearate, the mixture was granulated to a suitable size and the granules compressed to form tablets.

Instead of the thiosemicarbazone specified in the above formulation any other thiosemicarbazone within the scope of general Formula I may be employed, e.g. any of the other compounds of Formula I the preparation of which is described in Example II and IV to VII.

We claim:
1. A compound of the formula:

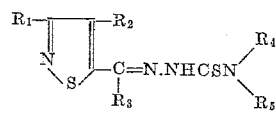

wherein $R_1$ represents a lower alkyl, $R_2$ represents a member of the class consisting of hydrogen and halogen, and $R_4$ and $R_5$ represent a member of the class consisting of hydrogen and lower alkoxyalkyl.

2. 3-methylisothiazole-5-carboxaldehyde thiosemicarbazone.

3. 4-bromo-3-methylisothiazole-5-carboxaldehyde thiosemicarbazone.

4. 5-acetyl-4-bromo-3-methylisothiazole thiosemicarbazone.

5. 3-methylisothiazole-5-carboxaldehyde 4'-(β-ethoxyethyl)-thiosemicarbazone.

6. 5-acetyl-3-methylisothiazole thiosemicarbazone.

References Cited in the file of this patent

UNITED STATES PATENTS

| 2,702,803 | Ainsworth | Feb. 22, 1955 |
| 2,721,868 | D'Amico | Oct. 25, 1955 |
| 2,807,567 | Rothlin et al. | Sept. 24, 1957 |
| 2,922,743 | McCowen | Jan. 26, 1960 |

FOREIGN PATENTS

| 835,753 | Great Britain | May 25, 1960 |